United States Patent
Beerse et al.

(10) Patent No.: US 9,167,029 B2
(45) Date of Patent: Oct. 20, 2015

(54) ADJUSTING INDIVIDUALS IN A GROUP CORRESPONDING TO RELEVANCY

(71) Applicant: International Business Machines Corporation, Armonk, NY (US)

(72) Inventors: Chelsea C. Beerse, Cary, NC (US); Patrick J. O'Sullivan, Dublin (IE); Jeffrey B. Sloyer, Cary, NC (US); Carol S. Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 13/776,808

(22) Filed: Feb. 26, 2013

(65) Prior Publication Data
US 2014/0244743 A1   Aug. 28, 2014

(51) Int. Cl.
*H04L 29/08* (2006.01)
*G06F 15/16* (2006.01)

(52) U.S. Cl.
CPC ..................... *H04L 67/10* (2013.01)

(58) Field of Classification Search
CPC ...................................................... H04L 67/10
See application file for complete search history.

(56) References Cited

U.S. PATENT DOCUMENTS

| | | | |
|---|---|---|---|
| 8,056,010 B2 | 11/2011 | Kieselbach et al. | |
| 2008/0147796 A1* | 6/2008 | Chmara et al. | 709/204 |
| 2011/0145334 A9* | 6/2011 | Colson et al. | 709/206 |

* cited by examiner

*Primary Examiner* — James Hwang
*Assistant Examiner* — Saraj Joshi
(74) *Attorney, Agent, or Firm* — Daniel R. Simek

(57) ABSTRACT

Embodiments of the present invention disclose a method, computer program product, and system for managing group members. A computer identifies a collaboration activity that corresponds to a defined group, wherein the defined group includes one or more individuals, and the collaboration activity is comprised of the defined group and one or more additional individuals. The computer determines participation and contribution information that correspond to the one or more individuals of the defined group and the one or more additional individuals included in the identified collaboration activity. The computer determines relevant individuals from the identified collaboration activity by utilizing determined participation and contribution information. In response to determining the relevant individuals, the computer determines an updated group wherein the updated group includes determined relevant individuals.

20 Claims, 3 Drawing Sheets

ADJUSTING INDIVIDUALS IN A GROUP CORRESPONDING TO RELEVANCY

FIELD OF THE INVENTION

The present invention relates generally to the field of collaborative group communications, and more particularly to adjusting the individuals in a group corresponding to relevancy.

BACKGROUND OF THE INVENTION

Collaborative computing allows a multitude of individuals to interact with each other through utilizing desktop computers, laptops, mobile devices, or other types of computing systems in a collaboration session. Some examples of collaboration sessions can include instant messaging conversations, teleconferences, electronic meetings, or other forms of collaboration of individuals in a group. The ability to share, modify and collaboratively create data through collaborative computing can enhance production and the overall quality of a product. These collaboration sessions can range from scheduled meetings including individuals from a common subject area, to unscheduled meetings including individuals from many different subject areas. In some examples, collaboration sessions can be derived in a non-deterministic manner (i.e. starting with a group of 5 individuals and then adding an additional 3 individuals over time). The ability to establish relevant and important individuals in these collaboration sessions can be of great benefit to the situation.

SUMMARY

Embodiments of the present invention disclose a method, computer program product, and system for managing group members. A computer identifies a collaboration activity that corresponds to a defined group, wherein the defined group includes one or more individuals, and the collaboration activity is comprised of the defined group and one or more additional individuals. The computer determines participation and contribution information that correspond to the one or more individuals of the defined group and the one or more additional individuals included in the identified collaboration activity. The computer determines relevant individuals from the identified collaboration activity by utilizing determined participation and contribution information. In response to determining the relevant individuals, the computer determines an updated group wherein the updated group includes determined relevant individuals.

DETAILED DESCRIPTION

Figure 1:
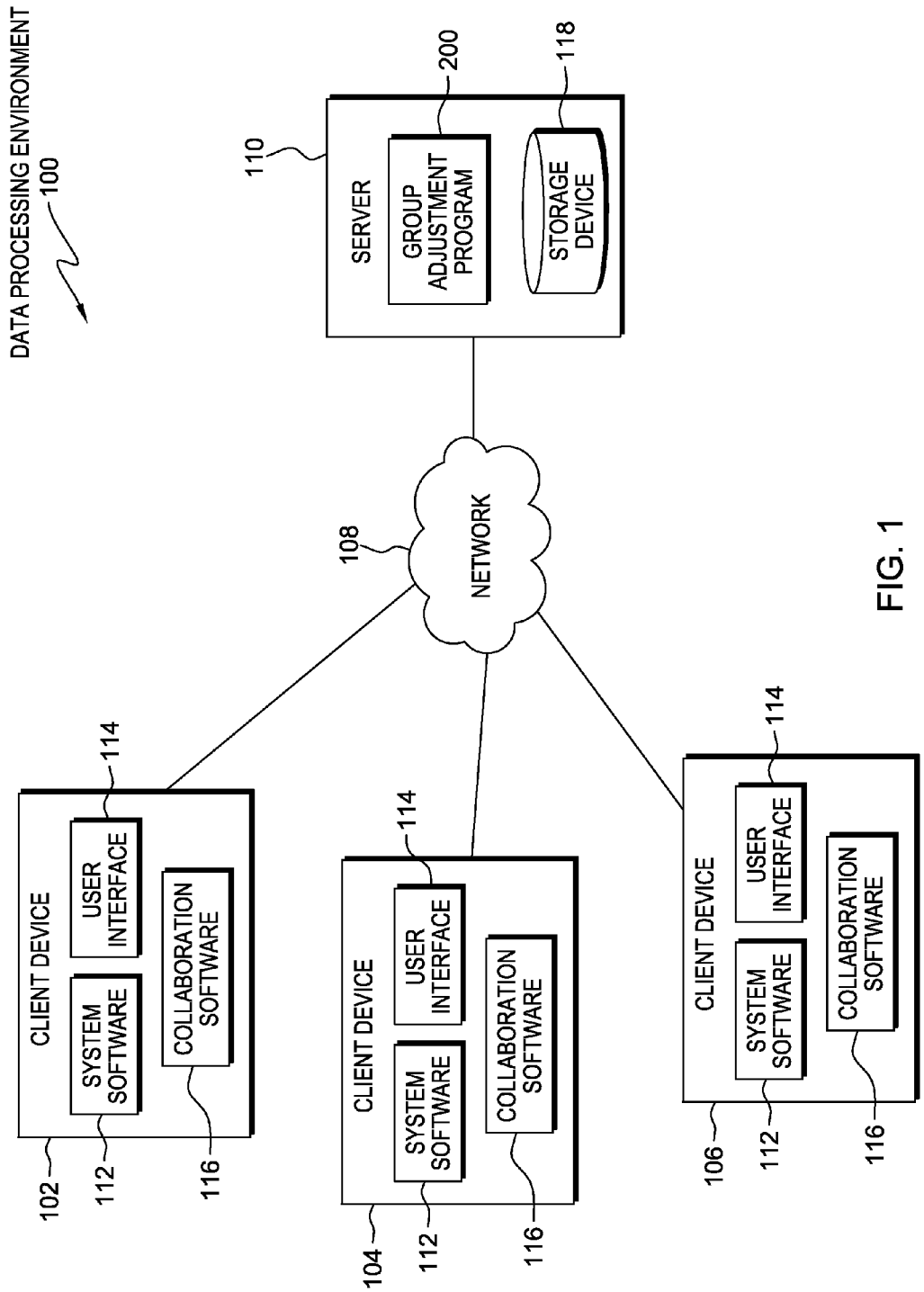
FIG. 1 is a functional block diagram of a data processing environment in accordance with an embodiment of the present invention.

Embodiments of the present invention recognize that situations often arise where a group of individuals gather in a collaboration session to discuss or make progress on a topic. In such situations, the group can be derived from an array of different divisions within a company or even from different companies, and receive a task that focuses on a specific subject area. Also, these groups can be derived through deterministic, or in a non-deterministic manner, and can be comprised of any number of individuals. An exemplary collaboration session can be a meeting in which 200 individuals are invited to attend. Embodiments of the present invention recognize that in many circumstances corresponding to such an example, not all of the invited individuals are going to be directly involved in providing a solution to a task addressed in the meeting. An ability to establish a group of individuals that are relevant to the task at hand can be valuable when developing a solution.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating data processing environment 100, in accordance with one embodiment of the present invention.

Data processing environment 100 includes client devices 102, 104, and 106, network 108, and server 110. In exemplary embodiments of the present invention, client devices 102, 104 and 106 may be workstations, personal computers, personal digital assistants, mobile phones, or any other devices capable of executing program instructions. In general, client devices 102, 104, and 106 are representative of any electronic device or combination of electronic devices capable of executing machine-readable program instructions, as described in greater detail with regard to FIG. 3. In alternate embodiments, data processing environment 100 can include other instances of client devices 102, 104 and 106 (i.e. can have more or less). In an exemplary embodiment, individuals utilizing client devices 102, 104, and 106 can access server 110 through network 108.

Client devices 102, 104, and 106 include system software 112, user interface 114, and collaboration software 116. In one embodiment, each instance of client devices 102, 104, and 106 includes iterations of the same system software 112, user interface 114, and collaboration software 116. In one embodiment, system software 112 may exist in the form of operating system software, which may be Windows®, LINUX®, and other application software such as internet applications and web browsers. User interface 114 allows for input into client devices 102, 104, and 106. In exemplary embodiments, user interface 114 allows individuals utilizing client devices 102, 104, and 106 to define and establish groups of individuals (discussed in greater detail with regard to FIG. 2). In one embodiment, client devices 102, 104, and 106 utilize collaboration software 116 to communicate with elements of data processing environment 100 in collaboration sessions. Some examples of collaboration sessions can include instant messaging conversations, teleconferences, electronic meetings, or other forms of electronic collaboration between client devices 102, 104, and 106. In an example, client device 102 utilizes collaboration software 116 to set up a meeting with client devices 104 and 106, which client devices 102, 104, and 106 utilize respective instances of collaboration software 116 to access the meeting through network 108. In another embodiment, collaboration software 116 can be utilized to send information regarding collaboration sessions to elements of data processing environment 100.

In one embodiment, elements of data processing environment 100 communicate through network 108. Network 108 can be, for example, a local area network (LAN), a telecommunications network, a wide area network (WAN) such as the Internet, or a combination of the three, and include wired, wireless, or fiber optic connections. In general, network 108 can be any combination of connections and protocols that will support communications between client devices 102, 104, and 106, and server 110 in accordance with exemplary embodiments of the present invention.

In one embodiment, server 110 can be desktop computers, specialized computer servers, or any other computer systems known in the art. In certain embodiments, server 110 represents a computer system utilizing clustered computers and components (e.g., database server computers, application server computers, etc.) that act as a single pool of seamless resources when accessed by elements of data processing environment 100. In general, server 110 is representative of any electronic device or combination of electronic devices capable of executing machine-readable program instructions, as described in greater detail with regard to FIG. 3. Server 110 facilitates collaboration sessions between client devices 102, 104, and 106, and stores corresponding information.

In one embodiment, server 110 includes storage device 118 and group adjustment program 200. Storage device 118 can be implemented with any type of database storage that is capable of storing data that may be accessed and utilized by client devices 102, 104, and 106, and server 110, such as a database server, a hard disk drive, or flash memory. In other embodiments, storage device 118 can represent multiple storage devices within server 110. In exemplary embodiments, storage device 118 stores information corresponding to collaboration sessions between client devices 102, 104, and 106. Information that storage device 118 stores can include, but is not limited to: defined groups of individuals, and information corresponding to the participation and contributions of individuals (discussed in greater detail with regard to FIG. 2). In exemplary embodiments, group adjustment program 200 manages a defined group responsive to participation and contributions of individuals in the group. In one embodiment, group adjustment program 200 utilizes information in storage device 118 to determine which individuals belong in a relevant group. Group adjustment program 200 is discussed in greater detail with regard to FIG. 2.

Figure 2:
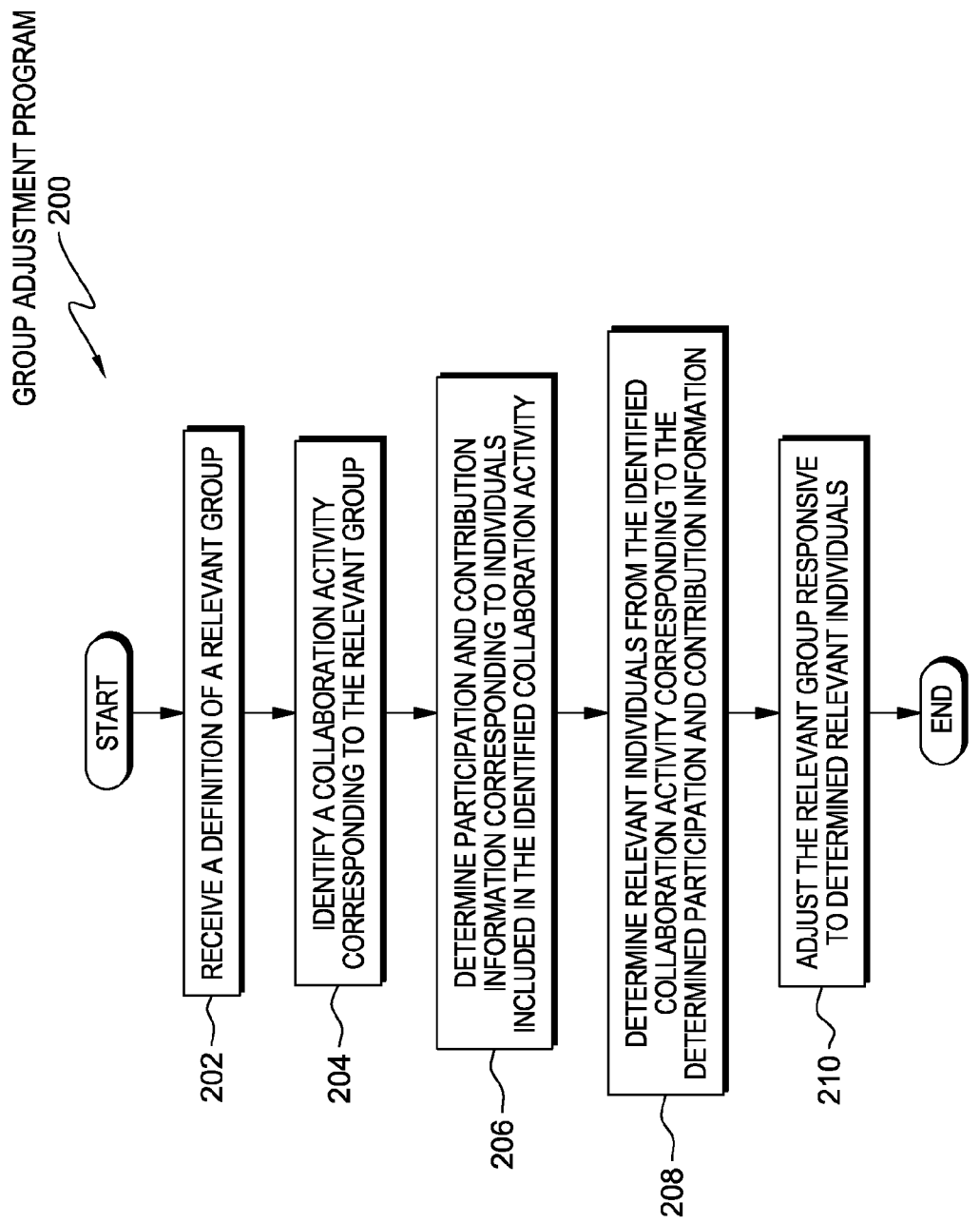
FIG. 2 is a flowchart depicting operational steps of a program for managing individuals in a group, in accordance with an embodiment of the present invention.

FIG. 2 is a flowchart depicting operational steps of group adjustment program 200 in accordance with an exemplary embodiment of the present invention. In an exemplary embodiment, individuals utilizing client devices 102, 104, and 106 can initiate group adjustment program 200 from within a collaboration session utilizing collaboration software 116.

In step 202, group adjustment program 200 receives a definition of a relevant group. In one embodiment, the defined group is a subset of a larger group. In an example, group adjustment program 200 can define a relevant group (a subset) of a larger group, wherein the relevant group is comprised of individuals utilizing client devices 102, 104, and 106. In one embodiment, during a collaboration session, group adjustment program 200 can define the relevant group through input into user interface 114 of client devices 102, 104, or 106. In a first example, an individual utilizing client device 102 schedules a meeting (i.e. an electronic meeting, an instant messaging chat) that includes 25 individuals that are meeting to discuss the solution to an issue. In this example, during the meeting, the individual utilizing client device 102 defines a relevant group including an individual utilizing client device 104, an individual utilizing client device 106, and two other individuals in the meeting that are going to work toward the solution of the issue. In the first example, the individual utilizing client device 102 can utilize collaboration software 116 to indicate which individuals are to be included in the relevant group. In a second example, over the course of multiple collaboration sessions relating to a certain issue or problem, an individual utilizing client device 102 (being the leader of the collaboration sessions) determines a relevant group including an individual utilizing client device 104, and four other individuals. In this example, the invitations for the collaboration sessions may have included 50 individuals, with 35 individuals attending a first meeting, and 30 individuals attending a second meeting. In the second example, some individuals that did not attend the first meeting attend the second meeting, and some individuals that did attend the first meeting did not attend the second meeting. From the attendance and contributions of these meetings, the individual utilizing client device 102 is able to determine a relevant group for solving the issue. In each of these examples, group adjustment program 200 receives the definition of the relevant group from the individual utilizing client device 102 through collaboration software 116. In another embodiment with regard to the second example, group adjustment program 200 determines relevant individuals responsive to participation and contributions of individuals in the previous collaboration sessions. In exemplary embodiments, upon defining a relevant group, the individuals utilizing client device 102, 104 or 106 assigns a name to the relevant group. The naming of the relevant group allows the defined relevant group to be involved in future collaboration communications that relate to the problem or issue that correlates with the group. In an exemplary embodiment, an individual utilizing client device 102, 104 or 106 can utilize the determined relevant group when establishing future collaboration activities.

In step 204, group adjustment program 200 identifies a collaboration activity corresponding to the relevant group. In one embodiment, group adjustment program 200 utilizes information stored within storage device 118 to identify completed collaboration activities that correspond to a certain relevant group. In exemplary embodiments, the completed collaboration activity identified by group adjustment program 200 can include instant messaging chats, and meetings that correspond to the assigned name of the relevant group. In exemplary embodiments, identified collaboration activities including a relevant group are not limited to only including the relevant group, and can include other individuals.

In step 206, group adjustment program 200 determines participation and contribution information corresponding to individuals included in the identified collaboration activity. In exemplary embodiments, group adjustment program 200 utilizes information corresponding to completed collaboration sessions, stored in storage device 118, that correspond to the assigned name of the relevant group. In exemplary embodiments, the information corresponding to the completed collaboration sessions includes attendance logs for collaboration sessions, and indications of which individuals in a collaboration session provided contributions to the collaboration session. In one embodiment, for each subsequent meeting involving a relevant group, participation and collaboration is recorded and stored in storage device 118. In exemplary embodiments, during a collaboration session, attendance is monitored, and individuals in the collaboration session providing contributions to the discussion can be identified (i.e. offered potential solutions, have a relevant background knowledge). In an example regarding an electronic meeting or teleconference, group adjustment program 200 tracks individuals that join the meeting or teleconference, and stores the information related to the attendance of the individuals in storage device 118. In another example regarding an instant messaging chat or email thread, group adjustment program 200 tracks individuals that read and respond to messages or emails and indicate which individuals did provide contributions (by reading or responding to messages or emails) in storage device 118. In exemplary embodiments, group adjustment program 200 can access any type of activity corresponding to the participation and contribution of individuals.

In step 208, group adjustment program 200 determines relevant individuals from the identified collaboration activity corresponding to the determined participation and contribution information. In one embodiment, group adjustment program 200 includes defined parameters that indicate minimum participation and contribution requirements that individuals are to maintain for membership in relevant group. In some examples, defined parameters can include individuals attending at least 75% of collaboration sessions (participation threshold), and individuals contributing to at least 50% of collaboration sessions (contribution threshold). In an exemplary embodiment, group adjustment program 200 utilizes the determined participation and contribution information corresponding to the identified collaboration session (from step 206) to determine whether individuals included in the collaboration session meet the thresholds of the parameters, and can be considered "relevant". In other embodiments, the individual that established the relevant group can adjust the thresholds of defined parameters. In an example, a previously defined participation threshold set at 75% can be reduced to 50% (the relevant group can be considered to be too large). In such an example, group adjustment program 200 can adjust the relevant group responsive to the reduced participation threshold (group adjustment discussed in greater detail with regard to step 210). In an example with regard to the first example previously discussed, group adjustment program 200 utilizes participation and contribution information corresponding to the identified collaboration activity to determine that the individual utilizing client device 104 no longer meets the threshold to be a relevant individual. In this example, group adjustment program 200 no longer includes the individual utilizing client device 104 in the classification of relevant individuals. In another example with regard to the second example previously discussed, group adjustment program 200 utilizes participation and contribution information corresponding to the identified collaboration activity to determine that an individual utilizing client device 106 now meets the threshold to be a relevant individual. In this example, group adjustment program 200 determines that the individual utilizing client device 106 is a relevant individual.

In step 210, group adjustment program 200 adjusts the relevant group responsive to determined relevant individuals. In one embodiment, group adjustment program 200 adds or removes individuals from the relevant group, responsive to whether or not an individual is determined to be a relevant individual (determined in step 208). With regard to the first example, group adjustment program 200 determines that the individual utilizing client device 104 is not a relevant individual (step 208). In this example, group adjustment program 200 removes the individual utilizing client device 104 from the relevant group. Therefore, future invitations for collaboration sessions corresponding to the relevant group will not automatically include the individual utilizing client device 104. With regard to the second example, group adjustment program 200 determines that the individual utilizing client device 106 is a relevant individual. In this example, group adjustment program 200 adds the individual utilizing client device 106 to the relevant group. Therefore, future invitations for collaboration sessions corresponding to the relevant group will automatically include the individual utilizing client device 106. In exemplary embodiments, when group adjustment program 200 is adding or removing one or more individuals from the relevant group, group adjustment program 200 prompts the individual that created the relevant group (i.e. individual utilizing client device 102) to determine whether or not to add or remove the one or more individuals from the relevant group. In another exemplary embodiment, when group adjustment program 200 is adding or removing one or more individuals from the relevant group, group adjustment program 200 adds or removes the one or more individuals and notifies the individual that created the relevant group (i.e. individual utilizing client device 102) of the action taken. In exemplary embodiments, the individual utilizing client device 102 (the individual that created the relevant group) can utilize group adjustment program 200 to add or remove individuals to the relevant group through a user interface (i.e. user interface 114 or a user interface associated with group adjustment program 200). In alternate embodiments, group adjustment program 200 repeats for all collaboration activities that correspond to a relevant group.

Figure 3:
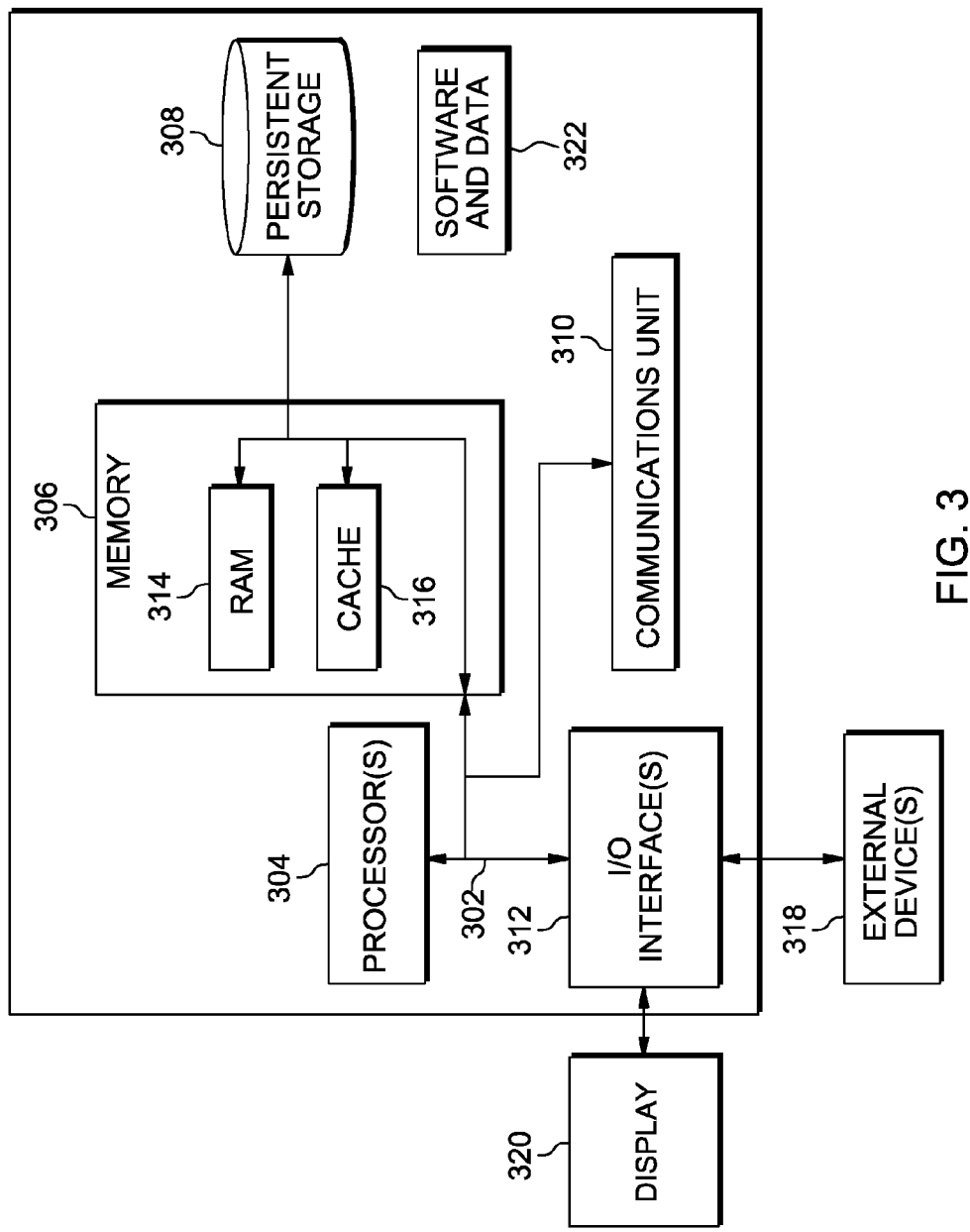
FIG. 3 depicts a block diagram of components of the computing system of FIG. 1 in accordance with an embodiment of the present invention.

FIG. 3 depicts a block diagram of components of computer 300, which is representative of client devices 102, 104, and 106, and server 110 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media. Software and data 322 stored in persistent storage 308 for execution and/or access by one or more of the respective computer processors 304 via one or more memories of memory 306. With respect to client devices 102, 104, and 106, software and data 322 includes system software 112 and collaboration software 116. With respect to server 110, software and data 322 includes group adjustment program 200.

In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Software and data 322 may be downloaded to persistent storage 308 through communications unit 310.

I/O interface(s) 312 allows for input and output of data with other devices that may be connected to computer 300. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data 322 can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor. Display 320 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for managing individuals in a group, the method comprising:
    a computer identifying a collaboration activity including a defined group and one or more additional individuals that are not members of the defined group;
    the computer determining contribution information corresponding to the one or more individuals of the defined group and the one or more additional individuals included in the identified collaboration activity, wherein the contribution information includes indications of which of the one or more individuals of the defined group and the one or more additional individuals included in the identified collaboration activity provided contributions relating to the purpose of the identified collaboration activity;
    the computer determining relevant individuals from the identified collaboration activity based on the determined contribution information, wherein a relevant individual is associated with determined contribution information indicating the relevant individual has provided contributions relating to the purpose of the identified collaboration activity; and
    responsive to determining relevant individuals from the identified collaboration activity, the computer determining an updated group including determined relevant individuals.

2. The method of claim 1, further comprising:
    the computer receiving a definition of the defined group, wherein the definition of the defined group includes identifying at least one individual and assigning a name to the defined group.

3. The method of claim 1, wherein the collaboration activity can comprise a meeting, an instant messaging chat, and a teleconference.

4. The method of claim 1, wherein the determining relevant individuals from the identified collaboration activity based on the determined contribution information, further comprises:
    the computer determining individuals of the one or more individuals of the defined group and the one or more additional individuals included in the identified collaboration activity that meet defined contribution thresholds utilizing at least in part the determined contribution information,
    wherein defined contribution thresholds comprise a minimum number of collaboration activities with contributions made relating to the purpose of the collaboration activity.

5. The method of claim 1, wherein the determining an updated group including determined relevant individuals, further comprises:
    the computer defining an updated group comprising the determined relevant individuals from the one or more individuals of the defined group and the one or more additional individuals included in the identified collaboration activity.

6. The method of claim 1, wherein the collaboration activity is an instant messaging group chat session having previously occurred and is associated with the defined group.

7. The method of claim 1, wherein determining relevant individuals from the identified collaboration activity based on the determined contribution information, comprises:
    the computer determining participation information corresponding to the one or more individuals of the defined group and the one or more additional individuals included in the identified collaboration activity, wherein the participation includes data indicating to at least in part of attendance of the one or more individuals of the defined group and the one or more additional individuals included in the identified collaboration activity; and
    the computer determining relevant individuals from the identified collaboration activity based on the determined contribution information and the determined participation information.

8. The method of claim 1, wherein the determined contribution information comprises one or more of: indications of individuals having background knowledge relevant to discussion in the identified collaboration session and indications of individuals having offered potential solutions to discussion topics in the identified collaboration session.

9. The computer program product of claim 1, wherein the determined contribution information comprises one or more of: indications of individuals having background knowledge relevant to discussion in the identified collaboration session and indications of individuals having offered potential solutions to discussion topics in the identified collaboration session.

10. The computer system of claim 1, wherein the determined contribution information comprises one or more of: indications of individuals that having background knowledge relevant to discussion in the identified collaboration session and indications of individuals having offered potential solutions to discussion topics in the identified collaboration session.

11. A computer program product for managing individuals in a group, the computer program product comprising:
    one or more computer-readable storage devices and program instructions stored on the one or more computer-readable storage devices, the program instructions comprising:
    program instructions to identify a collaboration activity including a defined group and one or more additional individuals not members of the defined group;
    program instructions to determine contribution information corresponding to the one or more individuals of the defined group and the one or more additional individuals included in the identified collaboration activity, wherein the contribution information includes indications of which of the one or more individuals of the defined group and the one or more additional individuals included in the identified collaboration activity provided contributions relating to the purpose of the identified collaboration activity;
    program instructions to determine relevant individuals from the identified collaboration activity based on the determined contribution information, wherein a relevant individual is associated with determined contribution information indicating the relevant individual has provided contributions relating to the purpose of the identified collaboration activity; and
    program instructions responsive to determining relevant individuals from the identified collaboration activity, program instructions to determine an updated group including determined relevant individuals.

12. The computer program product of claim 11, further comprising program instructions to:

receive a definition of the defined group, wherein the definition of the defined group includes identifying at least one individual and assigning a name to the defined group.

13. The computer program product of claim 11, wherein the collaboration activity can comprise a meeting, an instant messaging chat, and a teleconference.

14. The computer program product of claim 11, wherein program instructions to determine relevant individuals from the identified collaboration activity based on the determined contribution information, further comprise program instructions to:
   determine individuals of the one or more individuals of the defined group and the one or more additional individuals included in the identified collaboration activity meeting defined contribution thresholds utilizing at least in part the determined contribution information,
   wherein defined contribution thresholds comprise a minimum number of collaboration activities with contributions made relating to the purpose of the collaboration activity.

15. The computer program product of claim 11, wherein the program instructions to determine an updated group including determined relevant individuals, further comprise program instructions to:
   define an updated group comprising the determined relevant individuals from the one or more individuals of the defined group and the one or more additional individuals included in the identified collaboration activity.

16. A computer system for managing individuals in a group, the computer system comprising:
   one or more computer processors;
   one or more computer-readable storage devices;
   program instructions stored on the computer-readable storage devices for execution by at least one of the one or more processors, the program instructions comprising:
   program instructions to identify a collaboration activity including a defined group and one or more additional individuals not members of the defined group;
   program instructions to determine contribution information corresponding to the one or more individuals of the defined group and the one or more additional individuals included in the identified collaboration activity, wherein the contribution information includes indications of which of the one or more individuals of the defined group and the one or more additional individuals included in the identified collaboration activity provided contributions relating to the purpose of the identified collaboration activity;
   program instructions to determine relevant individuals from the identified collaboration activity based on the determined contribution information, wherein a relevant individual is associated with determined contribution information indicating the relevant individual has provided contributions relating to the purpose of the identified collaboration activity; and
   program instructions responsive to determining relevant individuals from the identified collaboration activity, program instructions to determine an updated group including determined relevant individuals.

17. The computer system of claim 16, further comprising program instructions to:
   receive a definition of the defined group, wherein the definition of the defined group includes identifying at least one individual and assigning a name to the defined group.

18. The computer system of claim 16, wherein the collaboration activity can comprise a meeting, an instant messaging chat, and a teleconference.

19. The computer system of claim 16, wherein program instructions to determine relevant individuals from the identified collaboration activity based on the determined contribution information, further comprise program instructions to:
   determine individuals of the one or more individuals of the defined group and the one or more additional individuals included in the identified collaboration activity meeting defined contribution thresholds utilizing at least in part the determined contribution information,
   wherein defined contribution thresholds comprise a minimum number of collaboration activities with contributions made relating to the purpose of the collaboration activity.

20. The computer system of claim 16, wherein the program instructions to determine an updated group including determined relevant individuals, further comprise program instructions to:
   define an updated group comprising the determined relevant individuals from the one or more individuals of the defined group and the one or more additional individuals included in the identified collaboration activity.

* * * * *